(12) United States Patent
Enomoto et al.

(10) Patent No.: US 10,451,796 B2
(45) Date of Patent: Oct. 22, 2019

(54) OPTICAL FIBER AND METHOD FOR PRODUCING OPTICAL FIBER

(71) Applicant: SUMITOMO ELECTRIC INDUSTRIES, LTD., Osaka-shi, Osaka (JP)

(72) Inventors: Tadashi Enomoto, Yokohama (JP); Takashi Fujii, Yokohama (JP); Tomoyuki Hattori, Yokohama (JP); Kazuyuki Sohma, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/322,559

(22) PCT Filed: Aug. 2, 2017

(86) PCT No.: PCT/JP2017/027984
§ 371 (c)(1),
(2) Date: Feb. 1, 2019

(87) PCT Pub. No.: WO2018/025896
PCT Pub. Date: Feb. 8, 2018

(65) Prior Publication Data
US 2019/0187366 A1   Jun. 20, 2019

(30) Foreign Application Priority Data
Aug. 2, 2016   (JP) .................................. 2016-151957

(51) Int. Cl.
G02B 6/02    (2006.01)
G02B 6/44    (2006.01)
(Continued)

(52) U.S. Cl.
CPC .......... *G02B 6/02395* (2013.01); *C03C 25/12* (2013.01); *G02B 6/036* (2013.01); *G02B 6/44* (2013.01)

(58) Field of Classification Search
CPC ...... G02B 6/02395; G02B 6/036; G02B 6/44; C03C 25/12; C03C 25/45
See application file for complete search history.

(56) References Cited

U.S. PATENT DOCUMENTS 6,849,333 B2 * 2/2005 Schissel ................ C03C 25/106
                                                                            385/123
8,452,146 B2   5/2013 Schiaffo et al.
(Continued)

FOREIGN PATENT DOCUMENTS

JP   2000-241680 A   9/2000

OTHER PUBLICATIONS

F. Cocchini, "The Lateral Rigidity of Double-Coated Optical Fibers," J. Lightwave Tech. 13 (1995) pp. 1706-1710.

*Primary Examiner* — Ryan A Lepisto
*Assistant Examiner* — Erin D Chiem
(74) *Attorney, Agent, or Firm* — Drinker Biddle & Reath LLP

(57) ABSTRACT

Provided is an optical fiber in which a primary coating layer and a secondary coating layer are formed on an outer circumference of a bare optical fiber including a core and a cladding. A Young's modulus of the primary coating layer is 0.1 to 1.0 MPa, a relationship between lateral rigidity D and flexural rigidity H of the optical fiber as expressed by formulas below satisfies $D/H^2 \leq 3 \times 10^{17}$ $N^{-1}$ $m^{-6}$, the primary coating layer contains 0.3 to 2.0 wt % of a photoinitiator including phosphorus, and the primary coating layer contains polypropylene glycol having a weight-average molecular weight of 1000 to 5000. The formulas include (Continued)

$$H = H_g + H_s = \pi r_g^4 E_g + \pi(r_{s_t}^4 - r_p^4)E_s \text{ and}$$

$$D = 0.897 E_p + 2.873(E_s - E_p)\left(\frac{E_p}{E_s}\right)^{0.8311}\left(2\frac{r_s - r_p}{r_s - r_g}\right)^{1.189},$$

where r represents a radius (m), E represents a Young's modulus (Pa), a subscript g represents glass (the bare optical fiber), a subscript p represents the primary coating layer, and a subscript s represents the secondary coating layer, respectively.

5 Claims, 2 Drawing Sheets

(51) Int. Cl.
    *C03C 25/12*     (2006.01)
    *G02B 6/036*     (2006.01)

(56) References Cited

U.S. PATENT DOCUMENTS

| | | | |
|---|---|---|---|
| 9,411,115 B2 * | 8/2016 | Tanaka | G02B 6/44 |
| 2003/0077059 A1 * | 4/2003 | Chien | C03C 25/106 |
| | | | 385/128 |

* cited by examiner

US 10,451,796 B2

OPTICAL FIBER AND METHOD FOR PRODUCING OPTICAL FIBER

TECHNICAL FIELD

The present invention relates to an optical fiber and a method for producing the same.

The present application claims priority from based on Japanese Patent Application No. 2016-151957, filed on Aug. 2, 2016, and the entire content of which is incorporated herein by reference.

BACKGROUND ART

The coating of an optical fiber having a core and a cladding includes two layers of a primary coating layer and a secondary coating layer in consideration of obtaining mechanical strength and suppressing microbend loss (for example, see Patent Literature 1). Non-Patent Literature 1 discloses that the microbending resistance of an optical fiber is related to the lateral rigidity D and flexural rigidity H of the optical fiber and can be obtained by the following formulas. In addition, in Patent Literature 2, there is description of microbend loss considered based on Non-Patent Literature 1.

[Formulas 1]

$$\alpha_{micro} \propto \frac{D}{H^2} \quad \text{Formula (1)}$$

$$H = H_g + H_s = \pi r_g^4 E_g + \pi (r_s^4 - r_p^4) E_s \quad \text{Formula (2)}$$

$$D = E_p + (E_s - E_p)\left(\frac{E_p}{E_s}\right)^{2/3}\left(2\frac{r_s - r_p}{r_s - r_g}\right)^{3/2} \quad \text{Formula (3)}$$

CITATION LIST

Patent Literature

Patent Literature 1: Japanese Patent Application Publication No. 2000-241680
Patent Literature 2: U.S. Pat. No. 8,452,146

Non-Patent Literature

Non-Patent Literature 1: F. Cocchini, "The Lateral Rigidity Of Double-Coated Optical Fibers", J. Lightwave Tech. 13 (1995) 1706

SUMMARY OF INVENTION

According to an aspect of the present disclosure, there is provided an optical fiber where a primary coating layer and a secondary coating layer are formed on an outer circumference of a bare optical fiber including a core and a cladding, in which a Young's modulus of the primary coating layer is 0.1 to 1.0 MPa, a relationship between lateral rigidity D and flexural rigidity H of the optical fiber as expressed by formulas below satisfies $D/H^2 \leq 3 \times 10^{17}$ N$^{-1}$ m$^{-6}$, the primary coating layer contains 0.3 to 2.0 wt % of a photoinitiator including phosphorus, and the primary coating layer contains polypropylene glycol having a weight-average molecular weight of 1000 to 5000.

[Formulas 2]

$$H = H_g + H_s = \pi r_g^4 E_g + \pi (r_s^4 - r_p^4) E_s \quad \text{Formula (2)}$$

$$D = 0.897 E_p + 2.873(E_s - E_p)\left(\frac{E_p}{E_s}\right)^{0.8311}\left(2\frac{r_s - r_p}{r_s - r_g}\right)^{1.189} \quad \text{Formula (4)}$$

In the formulas, r represents a radius (m), E represents a Young's modulus (Pa), a subscript g represents glass (the bare optical fiber), a subscript p represents the primary coating layer, and a subscript s represents the secondary coating layer, respectively.

According to another aspect of the present disclosure, there is provided a method for producing an optical fiber in which a primary coating layer and a secondary coating layer are formed on an outer circumference of a bare optical fiber formed of a core and a cladding, the method including:

forming the primary coating layer and the secondary coating layer such that a Young's modulus of the primary coating layer is 0.1 to 1.0 MPa, and a relationship between lateral rigidity D and flexural rigidity H of the optical fiber as expressed by formulas below satisfies $D/H^2 \leq 3 \times 10^{17}$ N$^{-1}$ m$^{-6}$;

containing 0.3 to 2.0 wt % of a photoinitiator including phosphorus in the primary coating layer; and containing polypropylene glycol having a weight-average molecular weight of 1000 to 5000 in the primary coating layer.

[Formulas 3]

$$H = H_g + H_s = \pi r_g^4 E_g + \pi (r_s^4 - r_p^4) E_s \quad \text{Formula (2)}$$

$$D = 0.897 E_p + 2.873(E_s - E_p)\left(\frac{E_p}{E_s}\right)^{0.8311}\left(2\frac{r_s - r_p}{r_s - r_g}\right)^{1.189} \quad \text{Formula (4)}$$

In the formulas, r represents a radius (m), E represents a Young's modulus (Pa), a subscript g represents glass (the bare optical fiber), a subscript p represents the primary coating layer, and a subscript s represents the secondary coating layer, respectively.

PROBLEM TO BE SOLVED BY THE PRESENT DISCLOSURE

Figure 1:
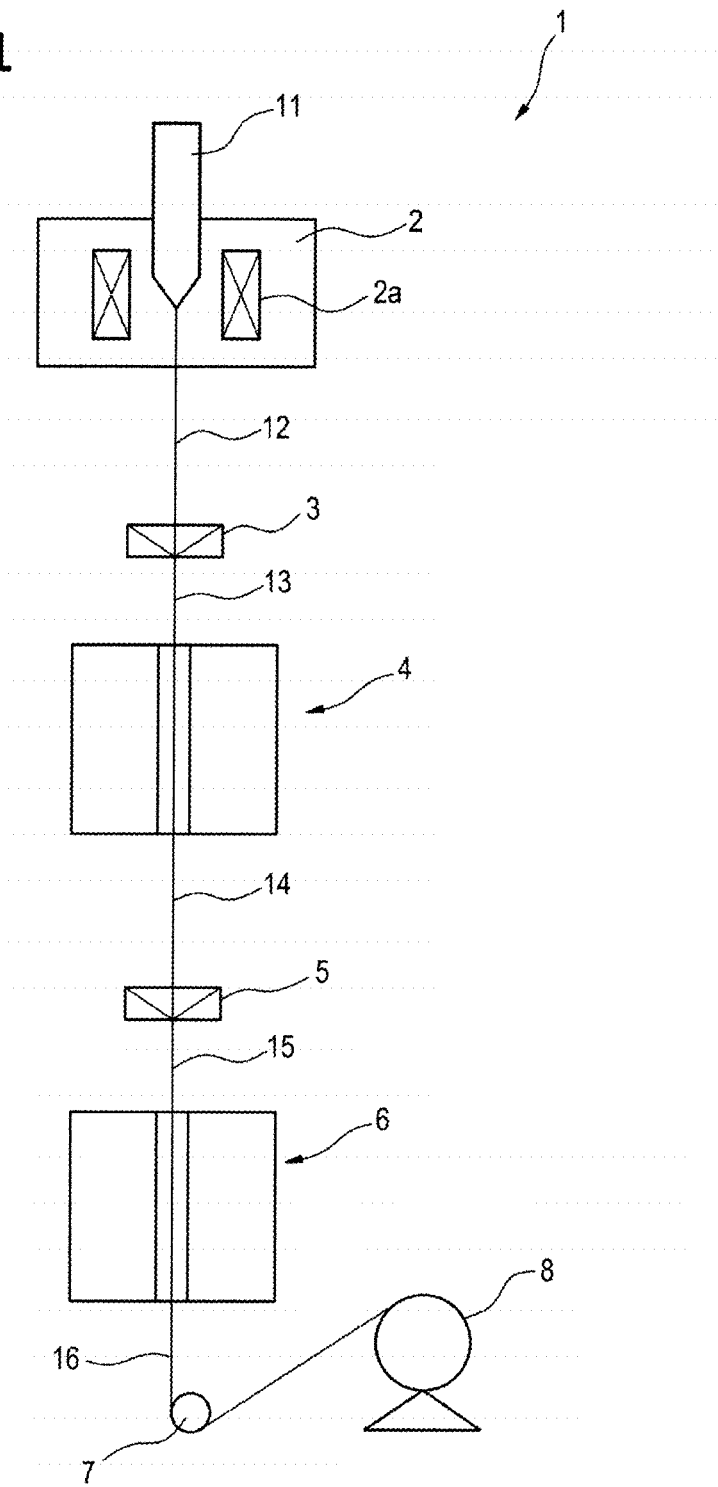
FIG. 1 is a schematic view of an apparatus for describing a method for producing an optical fiber according to an embodiment of the present invention.

However, the above formulas described in Non-Patent Literature 1 are "approximation formulas" calculated by numerical analysis when the Young's modulus of the primary coating layer is 10 to 20 MPa, and when the formulas are directly applied to an optical fiber with a primary coating layer having a Young's modulus of 1.0 MPa or less, it is found that there is a difference between the theoretical value and the actual measurement value, which is not preferable.

In addition, when the Young's modulus of the primary coating layer is reduced, there is a problem in that peeling of the interface between the glass and the primary coating layer or breakage of the resin coating is likely to occur as the optical fiber receives force from the outside during rewinding, a unitization process, or the like.

An object of the present disclosure is to provide an optical fiber and a method for producing the same capable of suppressing microbend loss even in a case of an optical fiber with a primary coating layer having a Young's modulus of 1.0 MPa or less, and not easily causing peeling of the interface between glass and the primary coating layer or breakage of a resin coating even when the optical fiber receives force from the outside during rewinding, a unitization process, or the like.

Effects of the Present Disclosure

According to the present disclosure, even in a case of an optical fiber with a primary coating layer having a Young's modulus of 1.0 MPa or less, microbend loss is suppressed and even when the optical fiber receives force from the outside during rewinding, a unitization process, or the like, peeling of the interface between the glass and the primary coating layer or breakage of the resin coating is less likely to occur.

Description of Embodiment of the Present Invention

Embodiment of the present invention will be listed and described.

(1) An optical fiber where a primary coating layer and a secondary coating layer are formed on an outer circumference of a bare optical fiber including a core and a cladding, in which a Young's modulus of the primary coating layer is 0.1 to 1.0 MPa, a relationship between lateral rigidity D and flexural rigidity H of the optical fiber as expressed by formulas below satisfies $D/H^2 \leq 3 \times 10^{17}$ $N^{-1}$ $m^{-6}$, the primary coating layer contains 0.3 to 2.0 wt % of a photoinitiator including phosphorus, and the primary coating layer contains polypropylene glycol having a weight-average molecular weight of 1000 to 5000.

[Formulas 4]

$$H = H_g + H_s = \pi r_g^4 E_g + \pi (r_s^4 - r_p^4) E_s \qquad \text{Formula (2)}$$

$$D = 0.897 E_p + 2.873(E_s - E_p) \left(\frac{E_p}{E_s}\right)^{0.8311} \left(2 \frac{r_s - r_p}{r_s - r_g}\right)^{1.189} \qquad \text{Formula (4)}$$

In the formulas, r represents a radius (m), E represents a Young's modulus (Pa), a subscript g represents glass (the bare optical fiber), a subscript p represents the primary coating layer, and a subscript s represents the secondary coating layer, respectively.

Accordingly, even in a case of an optical fiber with a primary coating layer having a Young's modulus of 1.0 MPa or less, microbend loss is suppressed and even when the optical fiber receives force from the outside during rewinding, a unitization process, or the like, peeling of the interface between the glass and the primary coating layer or breakage of the resin coating is less likely to occur.

(2) The optical fiber according to (1), in which the Young's modulus of the primary coating layer is 0.1 to 0.7 MPa.

Accordingly, microbend loss can be further suppressed.

(3) The optical fiber according to (1) or (2), in which the Young's modulus of the primary coating layer is 0.1 to 0.5 MPa.

Accordingly, microbend loss can be even further suppressed.

(4) The optical fiber according to any one of (1) to (3) that is a multimode optical fiber in which a core diameter of the core is 47.5 to 52.5 µm, a relative refractive index difference of the core to the cladding is 0.8% to 1.2%, and a trench portion is provided in the cladding region.

Since microbend loss is suppressed, the relative refractive index difference can be reduced, a combination of the coating of (1) and a low relative refractive index difference is a preferable aspect. In addition, microbend loss can be further suppressed by providing a trench to the cladding portion.

(5) According to another aspect of the present disclosure, there is provided a method for producing an optical fiber in which a primary coating layer and a secondary coating layer are formed on an outer circumference of a bare optical fiber including a core and a cladding, the method including:

forming the primary coating layer and the secondary coating layer such that a Young's modulus of the primary coating layer is 0.1 to 1.0 MPa, and a relationship between lateral rigidity D and flexural rigidity H of the optical fiber as expressed by formulas below satisfies $D/H^2 \leq 3 \times 10^{17}$ $N^{-1}$ $m^{-6}$;

containing 0.3 to 2.0 wt % of a photoinitiator including phosphorus in the primary coating layer; and containing polypropylene glycol having a weight-average molecular weight of 1000 to 5000 in the primary coating layer.

[Formulas 5]

$$H = H_g + H_s = \pi r_g^4 E_g + \pi (r_s^4 - r_p^4) E_s \qquad \text{Formula (2)}$$

$$D = 0.897 E_p + 2.873(E_s - E_p) \left(\frac{E_p}{E_s}\right)^{0.8311} \left(2 \frac{r_s - r_p}{r_s - r_g}\right)^{1.189} \qquad \text{Formula (4)}$$

In the formulas, r represents a radius (m), E represents a Young's modulus (Pa), a subscript g represents glass (the bare optical fiber), a subscript p represents the primary coating layer, and a subscript s represents the secondary coating layer, respectively.

Accordingly, it is possible to provide an optical fiber in which even in a case of a primary resin having a Young's modulus of 1.0 MPa or less, microbend loss is suppressed and even when the resin receives force from the outside during rewinding, a unitization process, or the like, peeling of the interface between the glass and the primary coating layer or breakage of the resin coating is less likely to occur.

Detail of the Embodiment of the Present Invention

Next, the embodiment of the optical fiber and the method for producing the same according to the present invention will be described with reference to the attached drawings.

The present invention is not limited to these examples and is intended to be represented by the claims and to encompass all modifications within the meaning and the scope equivalent to the claims.

Figure 2:
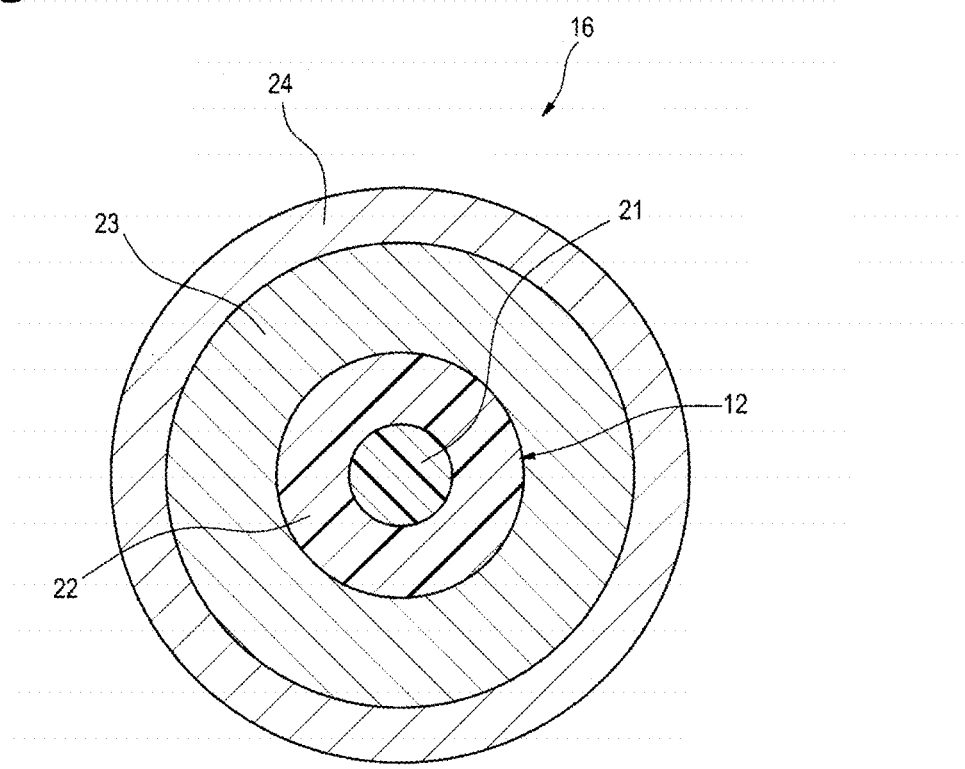
FIG. 2 is a cross-sectional view illustrating the structure of the optical fiber according to the embodiment of the present invention.

FIG. 1 is a schematic configuration view of a production apparatus used in a method for producing an optical fiber according to an embodiment of the present invention. FIG. 2 is a cross-sectional view illustrating a structure of an optical fiber produced by the method for producing an optical fiber according to the embodiment.

As illustrated in FIG. 1, an optical fiber producing apparatus 1 includes a drawing furnace 2, a primary resin coating device 3, an ultraviolet irradiation device for a primary resin 4, a secondary resin coating device 5, an ultraviolet irradiation device for a secondary resin 6, a guide roller 7, and a winding-up bobbin 8. In FIG. 1, a case where the primary resin coating device 3 and the secondary resin coating device 5 are separately provided and each resin is applied individually is described as an example, but each resin may be applied at the same time by an apparatus which simultaneously applies the primary resin and the secondary resin.

As illustrated in FIG. 1, the optical fiber producing apparatus 1 melts an optical fiber base material 11 made of quartz glass by heating by a heater 2a of the drawing furnace 2 from the tip thereof, stretches the film, and then performs melting-spinning on obtain a bare optical fiber 12 having an outer diameter of approximately 125 μm. The bare optical fiber 12 passes through the primary resin coating device 3 and a primary resin which is an ultraviolet curable resin is applied to the outer circumference thereof. Subsequently, an optical fiber 13 coated with the primary resin enters the ultraviolet irradiation device for a primary resin 4 and is irradiated with ultraviolet rays. Accordingly, the applied primary resin is cured to form a primary coating layer 23 (see FIG. 2).

An optical fiber 14 having the primary coating layer 23 formed thereon passes through the secondary resin coating device 5 and an ultraviolet curable resin is applied to the outer circumference thereof. Subsequently, an optical fiber 15 coated with the secondary resin enters the ultraviolet irradiation device for the secondary resin 6 and is irradiated with ultraviolet rays. Accordingly, the secondary resin is cured to form a secondary coating layer 24 (see FIG. 2). Then, an optical fiber 16 having the secondary coating layer 24 formed thereon is wound around the winding-up bobbin 8 through the guide roller 7 or the like.

As illustrated in FIG. 2, in the optical fiber 16 of the embodiment produced by the production method as described above, for example, the primary coating layer 23 is provided on the outer circumference of the bare optical fiber 12 having a core 21 and a cladding 22 and made of quartz glass at such a thickness that the outer diameter thereof is 170 to 215 μm. Further, the secondary coating layer 24 having a Young's modulus of, for example, 800 to 1200 MPa, which is larger than the Young's modulus of the primary coating layer 23, is provided on the outer circumference at such a thickness that the outer diameter thereof is approximately 245 μm. In the embodiment, a resin composition supplied to the primary resin coating device 3 is determined such that the Young's modulus of the primary coating layer 23 is 0.1 MPa or more and 1.0 MPa or less.

The invention of the present application is not limited to the optical fiber with the secondary coating layer having an outer diameter of approximately 245 μm and is applicable to a small diameter fiber with a secondary coating layer having an outer diameter of, for example, 160 μm to 210 μm.

The inventors of the present application focused on the relationship between the lateral rigidity D and the flexural rigidity H of an optical fiber, in consideration of an optical fiber including a primary coating layer containing relatively low Young's modulus, and intensively studied conditions in which microbend loss can be suppressed.

First, the derivation of a model formula (4) used for the optical fiber in which the Young's modulus of the primary coating layer is 1.0 MPa or less will be described.

In Non-Patent Literature 1, the following model formula is derived.

[Formula 6]

$$\frac{D - D_p}{D_s - D_p} \approx \left(\frac{E_p}{E_s}\right)^{2/3} \left(\frac{R_s - R_p}{R_s - R_g}\right)^{3/2}$$

When the exponential coefficient of Ep/Es is α, and the exponential coefficient of (Rs−Rp)/(Rs−Rg) is β, under the condition that the Young's modulus of the primary coating layer is 1.0 MPa or less, the exponential coefficients were calculated. However, appropriate fitting could not be obtained.

[Formula 7]

$$\frac{D - D_p}{D_s - D_p} \approx \left(\frac{E_p}{E_s}\right)^{\alpha} \left(\frac{R_s - R_p}{R_s - R_g}\right)^{\beta} \gamma$$

Here, a constant γ that is not described in Non-Patent Literature 1 was set in the above formula, and the respective constants were calculated by a least squares method under a condition that the Young's modulus of the primary coating layer is 1.0 MPa or less. And, when the calculated constants were used, good fitting was obtained.

Further, although the following approximation formula is used in Non-Patent Literature 1, it is found that this relational formula is not satisfied in an optical fiber in which the Young's modulus of the primary coating layer is 1.0 MPa or less.

[Formula 8]

$$\frac{D - D_p}{D_s - D_p} = \frac{D - E_p}{E_s - E_p}$$

Here, the above formula was replaced with the following formula.

[Formula 9]

$$\frac{D - D_p}{D_s - D_p} = \frac{D - xE_p}{x(E_s - E_p)}$$

x was calculated by the least squares method and combined with the following formula.

[Formula 10]

$$\frac{D - D_p}{D_s - D_p} \approx \left(\frac{E_p}{E_s}\right)^\alpha \left(\frac{R_s - R_p}{R_s - R_g}\right)^\beta \gamma$$

And thus, formula (4) of the present application, which is appropriate in terms of science and engineering, was derived.

[Formula 11]

$$D = 0.897 E_p + 2.873(E_s - E_p)\left(\frac{E_p}{E_s}\right)^{0.8311} \left(2\frac{r_s - r_p}{r_s - r_g}\right)^{1.189} \quad (4)$$

When the microbend loss is larger than 1.0 dB/km, the light transmission efficiency is poor and is not preferable. The microbend loss α is expressed by the following formula using a proportionality constant A based on the propagation characteristics and the like of the optical fiber.

[Formula 12]

$$\alpha = A \frac{D}{H^2}$$

α can be calculated from $D/H^2$.

This A was calculated from the actually measured α and $D/H^2$ by the least squares method. Then, in consideration of variation in quality when producing the optical fiber, based on the following formula representing the microbend loss $\alpha_{2\sigma}$ assumed from $D/H^2$, a value of $D/H^2$: $3\times10^{17}$ N$^{-1}$ m$^{-6}$ where $\alpha_{2\sigma}$ becomes 1.0 dB/km was calculated using a value (A+2σ) obtained by adding a value twice the standard deviation σ to A.

[Formula 13]

$$\alpha_{2\sigma} = (A + 2\sigma)\frac{D}{H^2}$$

Accordingly, it can be said that by satisfying $D/H^2 \leq 3\times 10^{17}$ N$^{-1}$ m$^{-6}$, an optical fiber with good optical transmission efficiency with a side pressure loss α of 1.0 dB/km or less can be obtained even in consideration of variation in quality when manufacturing.

There are single mode fiber (SMF) and multimode fiber (MMF) as the type of optical fiber and when the values of $D/H^2$ are the same, the microbend loss tends to be larger in MMF than in SMF. Thus, $D/H^2 \leq 3\times10^{17}$ is determined based on the actual measure value of the microbend loss of MMF, but the microbend loss will not be a problem even in SMF as long as the value is within this range.

In the optical fiber 16 of the embodiment, the primary coating layer 23 and the secondary coating layer 24 are formed such that the relationship between the lateral rigidity D and the flexural rigidity H calculated based on the above formulas (2) and (4) satisfies $D/H^2 \leq 3\times10^{17}$ N$^{-1}$ m$^{-6}$. Accordingly, even when the Young's modulus of the primary coating layer 23 is 1.0 MPa or less, microbend loss is suppressed.

Since D and H are determined only by the Young's modulus and the thickness of the primary resin and the secondary resin except for the parameters of the bare optical fiber, $D/H^2 \leq 3\times10^{17}$ can be realized by appropriately setting these parameters.

In the embodiment, the Young's modulus of the primary coating layer 23 is preferably 0.1 MPa or more and 0.7 MPa or less. Accordingly, microbend loss can also be suppressed. The Young's modulus of the primary coating layer 23 is more preferably 0.1 MPa or more and 0.5 MPa or less. Accordingly, microbend loss can be further suppressed.

The core diameter of the core 21 is preferably 47.5 to 52.5 µm, the relative refractive index difference of the core 21 to the cladding 22 is more preferably 0.8% to 1.2%, and a trench portion is preferably provided in the cladding 22 region. In the embodiment, since microbend loss is suppressed, it is possible to reduce the relative refractive index difference, and by providing a trench to the cladding portion, the microbend loss can be suppressed. The trench portion is a region in which the relative refractive index difference is lower than other regions in the cladding region.

The primary coating layer 23 contains 0.3 to 2.0 wt % of a photoinitiator including phosphorus, and the primary coating layer 23 contains polypropylene glycol having a weight-average molecular weight of 1000 to 5000. Accordingly, in the optical fiber having the primary coating layer having a relatively low Young's modulus, even when the optical fiber receives force from the outside during rewinding, a unitization process, or the like, peeling of the interface between the glass and the primary coating layer or breakage of the resin coating is less likely to occur.

The smaller the amount of residual acrylate of the primary coating layer 23 is, the more preferable it is. In this case, a cross-link can be appropriately formed in the primary resin layer and thus breakage of the resin coating is even less likely to occur. When the amount of residual acrylate is large, breakage of the resin coating is likely to occur due to an insufficient cross-link in the primary resin layer, and this case is not preferable. In addition, since the cross-link progresses with the lapse of time, the physical properties, such as Young's modulus, of the primary resin coating layer are changed, and even when microbend loss is suppressed initially, there is a possibility of occurrence of microbend loss may increase over time. Thus, this case is not preferable. In order to set the amount of residual acrylate to be within an appropriate range, there is a method of changing the formulation of the resin material and increasing the amount of ultraviolet irradiation to be applied for cross-link.

For the primary resin, it is preferable to use polyether-based or polyester-based urethane acrylate, and if necessary, a reactive diluent monomer and a photo initiator may be contained.

Examples of the reactive diluent monomer include monofunctional compounds such as N-vinylpyrrolidone, N-vinylcaprolactam, N-vinylacetamide, methoxyethylene glycol (meth)acrylate, methoxypolyethylene glycol (meth)acrylate, aromatic polyethylene glycol monoacrylate, phenoxyethyl (meth)acrylate, phenoxypolypropylene (meth)acrylate, 2-hydroxypropyl (meth)acrylate, 2-ethylhexyl (meth)acrylate, lauryl acrylate, isoboronyloxyethyl (meth)acrylate, and morpholine (meth)acrylate; and bifunctional compounds such as di(meth)acrylate of 2,2-dimethyl-3-hydroxypropyl-2,2-dimethyl-3-hydroxypropionate, ethylene glycol di(meth)acrylate, propylene glycol di(meth)acrylate, 1,4-butane diol di(meth)acrylate, di(meth)acrylate of bisphenol A ethylene oxide adduct, di(meth)acrylate of 2,2'-di(hydroxyethoxyphenyl)propane, di(meth)acrylate of tricyclodecane dimethylol, and dicyclopentadiene di(meth)acrylate. These may be used alone or in combination of two or more thereof.

As the photoinitiator, known photoinitiators can be used, and examples thereof include LUCIRIN (registered trademark) TPO and IRGACURE (registered trademark) 819 manufactured by BASF. These may be used alone or in combination of two or more thereof.

In this case, the Young's modulus of the primary coating layer 23 was adjusted by, for example, the molecular weight of the polyether portion of the ultraviolet curable resin and the type of the diluent monomer. That is, the Young's modulus of the primary coating layer 23 can be reduced by increasing the molecular weight of the polyether portion and selecting a monofunctional diluent monomer having a large linear molecular weight.

For the secondary resin, it is preferable to use polyether-based or polyester-based urethane acrylate, and if necessary, a reactive diluent monomer and a photoinitiator may be contained.

Examples of the reactive diluent monomer include monofunctional compounds such as N-vinylpyrrolidone, N-vinylcaprolactam, N-vinylacetamide, methoxyethylene glycol (meth)acrylate, methoxypolyethylene glycol (meth)acrylate, phenoxyethyl (meth)acrylate, phenoxypolypropylene (meth)acrylate, 2-hydroxypropyl (meth)acrylate, 2-ethylhexyl (meth)acrylate, isoboronyloxyethyl (meth)acrylate, and morpholine (meth)acrylate; bifunctional compounds such as di(meth)acrylate of 2,2-dimethyl-3-hydroxypropyl-2,2-dimethyl-3-hydroxypropionate, ethylene glycol di(meth)acrylate, propylene glycol di(meth)acrylate, 1,4-butane diol di(meth)acrylate, di(meth)acrylate of bisphenol A ethylene oxide adduct, di(meth)acrylate of 2,2'-di(hydroxyethoxyphenyl)propane, di(meth)acrylate of tricyclodecane dimethylol, and dicyclopentadiene di(meth)acrylate; polyfunctional compounds such as trimethylolpropane tri(meth)acrylate, trimethylolpropane trioxyethyl (meth)acrylate, pentaerythritol tri(meth)acrylate, dipentaerythritol hexa(meth)acrylate, tris(hydroxyethyl) isocyanurate tri(meth)acrylate, tris(acryloxymethyl) isocyanurate, and triallyl isocyanurate. These may be used alone or in combination of two or more thereof.

As the photoinitiator, known photoinitiators can be used and examples thereof include phenones such as 1-hydroxycyclohexyl phenyl ketone, 2,2-dimethoxy-2-phenylacetophenone, phenylacetophenone diethyl ketal, alkoxyacetophenones, benzyl methyl ketal, and benzophenone; and phosphine oxide derivatives such as 2-hydroxy-2-methyl-propiophenone, 2,4,6-trimethylbenzoyldiphenylphosphine oxide, and bis(2,6-dimethoxybenzoyl)-2,4,4-trimethylpentylphosphine oxide. These may be used alone or in combination of two or more thereof.

In this case, the Young's modulus of the secondary coating layer 24 was adjusted by, for example, the molecular weight of the polyether portion of the ultraviolet curable resin and the type of the diluent monomer. That is, the Young's modulus can be increased by decreasing the molecular weight of the polyester or polyether portion, increasing the concentration of urethane, and selecting a monomer or a polyfunctional monomer having a rigid molecular structure such as a benzene ring.

REFERENCE SIGNS LIST 1 optical fiber producing apparatus
2 drawing furnace
2a heater
3 primary resin coating device
4 ultraviolet irradiation device for a primary resin
5 secondary resin coating device
6 ultraviolet irradiation device for a secondary resin
7 guide roller
8 winding-up bobbin
11 optical fiber base material
12 bare optical fiber
13 optical fiber coated with the primary resin
14 optical fiber having the primary coating layer
15 optical fiber coated with the secondary resin
16 optical fiber
21 core
22 cladding
23 primary coating layer
24 secondary coating layer

The invention claimed is:

1. An optical fiber in which a primary coating layer and a secondary coating layer are formed on an outer circumference of a bare optical fiber including a core and a cladding, wherein
a Young's modulus of the primary coating layer is 0.1 to 1.0 MPa,
a relationship between lateral rigidity D and flexural rigidity H of the optical fiber as expressed by formulas below satisfies $D/H^2 \leq 3 \times 10^{17} \text{ N}^{-1} \text{ m}^{-6}$,
the primary coating layer contains 0.3 to 2.0 wt % of a photoinitiator including phosphorus,
the primary coating layer contains polypropylene glycol having a weight-average molecular weight of 1000 to 5000, and the formulas include $$H = H_g + H_s = \pi r_g^4 E_g + \pi(r_s^4 - r_p^4)E_s \text{ and} \qquad \text{Formula (2)}$$

$$D = 0.897 E_p + 2.873(E_s - E_p)\left(\frac{E_p}{E_s}\right)^{0.8311}\left(2\frac{r_s - r_p}{r_s - r_g}\right)^{1.189}, \qquad \text{Formula (4)}$$

where r represents a radius (m), E represents a Young's modulus (Pa), a subscript g represents glass (the bare optical fiber), a subscript p represents the primary coating layer, and a subscript s represents the secondary coating layer, respectively.

2. The optical fiber according to claim 1, wherein the Young's modulus of the primary coating layer is 0.1 to 0.7 MPa.

3. The optical fiber according to claim 1, wherein the Young's modulus of the primary coating layer is 0.1 to 0.5 MPa.

4. The optical fiber according to claim 1, wherein the optical fiber is a multimode optical fiber in which a core diameter of the core is 47.5 to 52.5 µm, a relative refractive index difference of the core to the cladding is 0.8% to 1.2%, and a trench portion is provided in a cladding region.

5. A method for producing an optical fiber in which a primary coating layer and a secondary coating layer are formed on an outer circumference of a bare optical fiber including a core and a cladding, the method comprising:
forming the primary coating layer and the secondary coating layer such that a Young's modulus of the primary coating layer is 0.1 to 1.0 MPa, and a relationship between lateral rigidity D and flexural rigidity H of the optical fiber as expressed by formulas below satisfies $D/H^2 \leq 3 \times 10^{17} \text{ N}^{-1} \text{ m}^{-6}$;
containing 0.3 to 2.0 wt % of a photoinitiator including phosphorus in the primary coating layer; and containing polypropylene glycol having a weight-average molecular weight of 1000 to 5000 in the primary coating layer, wherein the formulas include $$H = H_g + H_s = \pi r_g^4 E_g + \pi(r_s^4 - r_p^4)E_s \text{ and} \qquad \text{Formula (2)}$$

$$D = 0.897 E_p + 2.873(E_s - E_p)\left(\frac{E_p}{E_s}\right)^{0.8311}\left(2\frac{r_s - r_p}{r_s - r_g}\right)^{1.189}, \qquad \text{Formula (4)}$$

where r represents a radius (m), E represents a Young's modulus (Pa), a subscript g represents glass (the bare optical fiber), a subscript p represents the primary coating layer, and a subscript s represents the secondary coating layer, respectively.

* * * * *